US008903755B2

(12) United States Patent
Berlandier et al.

(10) Patent No.: US 8,903,755 B2
(45) Date of Patent: Dec. 2, 2014

(54) IMPLEMENTING META RULES ON AN EXECUTABLE RULE ENGINE

(75) Inventors: Pierre Berlandier, San Diego, CA (US); Zhen Huan Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 13/491,285

(22) Filed: Jun. 7, 2012

(65) Prior Publication Data

US 2013/0332404 A1 Dec. 12, 2013

(51) Int. Cl.
*G06N 5/00* (2006.01)
*G06F 1/00* (2006.01)

(52) U.S. Cl.
USPC .............................. 706/47; 715/739; 717/104

(58) Field of Classification Search
CPC ........... G06N 5/02; G06N 5/025; G06N 5/04; G06Q 10/00; G06F 17/30
USPC ........................................................ 706/47
See application file for complete search history.

(56) References Cited

U.S. PATENT DOCUMENTS

| 7,827,206 | B2 | 11/2010 | Holmes et al. |
| 2006/0009991 | A1 | 1/2006 | Jeng et al. |
| 2007/0239570 | A1* | 10/2007 | Kam-Chak Cheng et al. . 705/35 |
| 2011/0010326 | A1 | 1/2011 | Neale et al. |
| 2012/0066662 | A1* | 3/2012 | Chao et al. .................... 717/104 |

* cited by examiner

*Primary Examiner* — Jeffrey Gaffin
*Assistant Examiner* — Kalpana Bharadwaj
(74) *Attorney, Agent, or Firm* — Kunzler Law Group, PC; Steven L. Bennett

(57) ABSTRACT

The method for implementing meta rules on an executable rule engine includes parsing a business rule as input into a meta rule on a rule engine. The meta rule includes a first expression defining one or more style conditions for business rules. The business rule includes a second expression defining logic for an entity. The method includes determining that a business rule violates a style condition defined by the meta rule. The business rule and the meta rule conform to a common business rule syntax. The method includes generating a notification in response to determining that the business rule violates the style condition of the meta rule.

16 Claims, 9 Drawing Sheets

IMPLEMENTING META RULES ON AN EXECUTABLE RULE ENGINE

FIELD

The subject matter disclosed herein relates to business rules executed on a rule engine and more particularly relates to implementing meta rule functions within an executable rule engine to check conditions of executable business rules.

BACKGROUND

Description of the Related Art

Business rules are executable logic expressions that define logic and policies for an organization and execute on an executable business rule engine. Business rules are syntactical expressions that are in more of a natural language style than typical code and are often authored and managed by a variety of users in varying capacities and technical backgrounds throughout the organization. Often, an organization will supply documentation to govern business rule writing in an effort to maintain consistency among the executable business rules and to impose styles that go beyond business rules that are merely syntactically correct.

However, users may ignore the documentation or lack the skills necessary to carry out desired business rule conventions. The resulting business rules may execute without errors, return correct results, or be semantically correct, but may be of varying styles and/or violate style preferences of the organization.

BRIEF SUMMARY

One embodiment of a method for implementing meta rules on an executable rule engine is disclosed. The method includes, in one embodiment, parsing a business rule as input into a meta rule executing on a rule engine. The meta rule includes a first expression defining one or more style conditions for business rules. The business rule includes a second expression defining logic for an entity. In one embodiment, the method includes determining that a business rule violates a style condition defined by the meta rule. The business rule and the meta rule conform to a common business rule syntax. The method, in one embodiment, generates a notification in response to determining that the business rule violates the style condition of the meta rule.

In one embodiment, the business rule is one of a plurality of business rules in a business rule-set. In a further embodiment, the method further includes determining whether business rules of the business rule set violates the style condition of the meta rule. In a further embodiment, parsing the business rule further comprises parsing the business rule-set to extract one or more components of the business rules in the business rule-set and transforming the components of the business rule-set into a syntactic model representing the one or more components. In a further embodiment, determining that the business rule violates the style condition defined by the meta rule further includes analyzing, using a helper function, the syntactic model. The helper function module is invoked by the meta rule. In a further embodiment, the syntactic model includes an abstract syntax tree.

In one embodiment, the business rule is executable on the rule engine. In one embodiment, the one or more style conditions of the meta rule include predefined business rule conventions specifying unwanted characteristics of business rules. In certain embodiments, the method includes receiving style definition input through a rule authoring application. The style definition input defines one or more components for a particular meta rule. In a further embodiment, the method includes creating, using the rule authoring application, the particular meta rule based on the style definition input. In a further embodiment, the rule authoring application creates one or more particular business rules based on business rule definition input.

In one embodiment, each of the meta rule and the business rule include natural language expressions. The method, in one embodiment, includes generating a style report including the notification for the business rule and one or more additional notifications for one or more additional business rules. The one or more additional notifications indicate that the one or more additional business rules violate style conditions of the meta rule.

One embodiment of an apparatus for implementing meta rules on an executable rule engine is provided with a plurality of modules configured to functionally execute the steps described above with regard to the method. These modules, in the described embodiments, include an execution module, a determination module, and a generation module. In one embodiment, the execution module parses a business rule as input into a meta rule on a rule engine. The meta rule includes a first expression defining one or more style conditions for business rules. The business rule includes a second expression defining logic for an entity. The determination module, in one embodiment, determines that a business rule violates a style condition defined by the meta rule. The business rule and the meta rule conform to a common business rule syntax. The generation module, in one embodiment, generates a notification in response to determining that the business rule violates the style condition of the meta rule.

In one embodiment, the business rule is executable on the rule engine. In one embodiment, the apparatus includes a rule authoring module that receives style definition input through a rule authoring application. The style definition input defines one or more components for a particular meta rule. The rule authoring module, in a further embodiment, creates, using the rule authoring application, the particular meta rule based on the style definition input. In one embodiment, the business rule comprises one of a plurality of business rules in a business rule-set and the execution module parses a business rule-set to extract one or more components of business rules in the business rule-set and transforms the business rule-set into a syntactic model representing the one or more components of business rules in the business rule-set. In one embodiment, the apparatus includes a helper function module that analyzes, using a helper function, the syntactic model.

A computer program product for implementing meta rules on an executable rule engine may be included where the computer program product includes a computer readable storage medium having computer readable program code embodied therewith. The computer readable program code includes computer readable program code configured to include the method described above.

Another embodiment of a method is presented that includes deploying a meta rule apparatus onto a computing system. In one embodiment, the meta rule apparatus is capable of parsing a business rule as input into a meta rule on a rule engine. The meta rule includes a first expression defining one or more style conditions for business rules. The business rule includes a second expression defining logic for an entity. The meta rule apparatus, in one embodiment, is capable of determining that a business rule violates a style condition defined by the meta rule. The business rule and the meta rule conform to a common business rule syntax. The meta rule apparatus, in one embodiment is capable of generating a notification in response to determining that the business rule violates the style condition of the meta rule.

In a further embodiment, the deploying the meta rule apparatus onto the computing system includes loading the meta rule apparatus onto the computing system with a storage medium storing the meta rule apparatus. In one embodiment, deploying the meta rule apparatus onto the computing system includes sending the meta rule apparatus to a central server. The meta rule apparatus is downloaded onto the computing system. In one embodiment, deploying the meta rule apparatus onto the computing system includes sending the meta rule apparatus to a storage medium of the computing system. In one embodiment, deploying the meta rule apparatus onto the computing system includes sending the meta rule apparatus to a proxy server. The meta rule apparatus is downloaded to the computing system from the proxy server.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
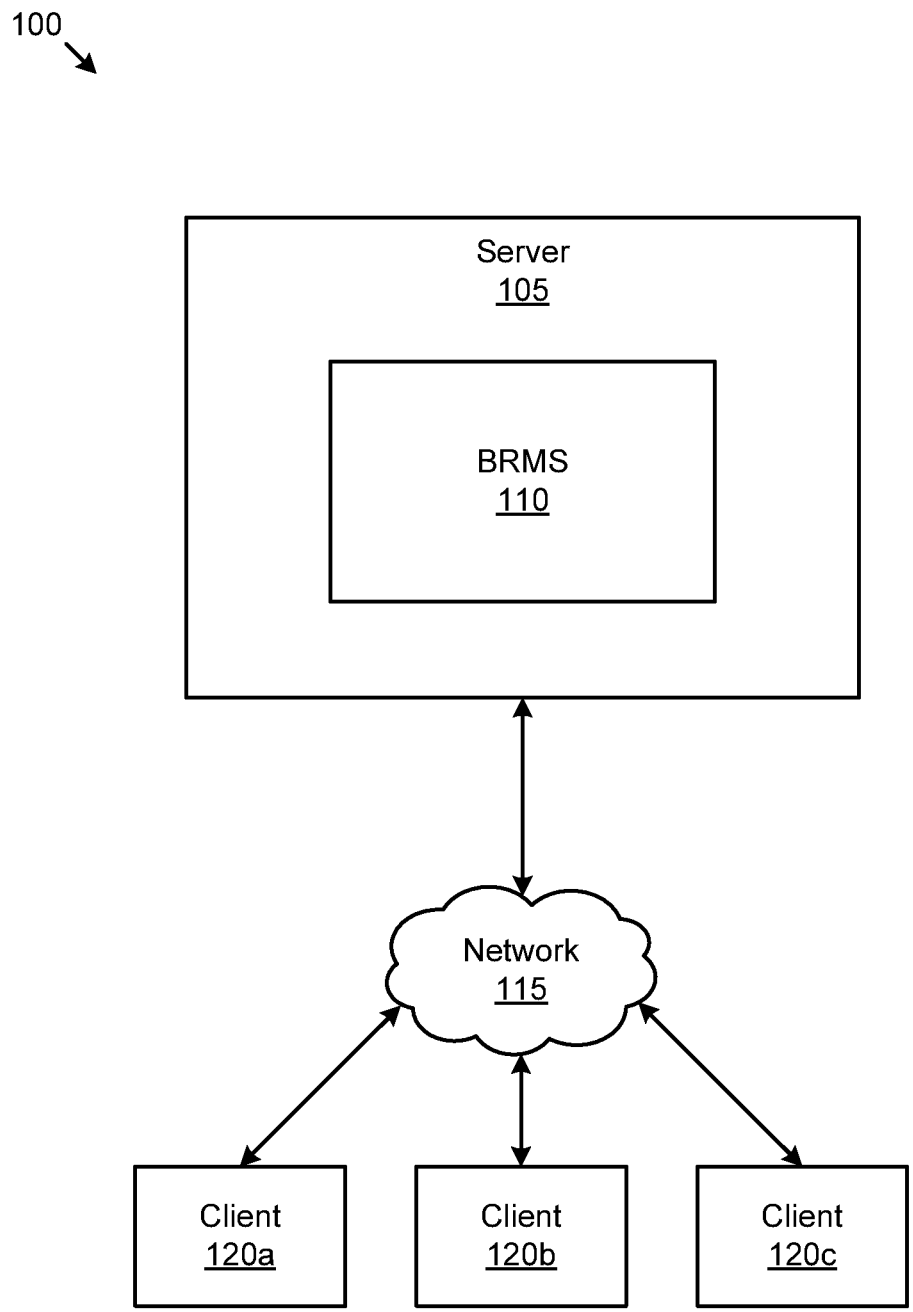
FIG. 1 is a schematic block diagram illustrating one embodiment of a system for implementing meta rules on an executable rule engine in accordance with the present invention.

A business rule management system (BRMS) is an application to author, manage, and/or execute business rules. Business rules, often executed in groups called business rule-sets, include logic expressions that input data and evaluate certain conditions in the data, which may involve such things as insurance claim information, loan applications, and the like. Business rules are intended to be expressed in a more natural language form than typical computer code. However, conventional BRMSs lack the capability to effectively input business rule-sets into other business rules as the resulting data structures for the parsed business rule-set would be too large and complex for another business rule to evaluate usefully. Consequently, embodiments of the present invention allow business rules to be input into and analyzed by other business rules, referred to as meta rules. Embodiments of the present invention provide logic to evaluate the parsed business rules that may be invoked by the meta rules. Therefore, the meta rules may share a common syntax with the business rules they check, allowing users and authors of the business rules to also use and author the meta rules. The meta rules allow checking for conditions that go beyond merely checking for syntactical correctness, but allow style-type meta rules that are executable on a BRMS, which is a feature not currently available.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented using various forms of logic hardware, such as a hardware circuit comprising custom VLSI circuits or gate arrays, off-the-shelf semiconductors such as logic chips, transistors, or other discrete components. A module may also be implemented as logic hardware in programmable hardware devices such as field programmable gate arrays, programmable array logic, programmable logic devices or the like.

Modules may also be implemented in software as computer readable program code for execution by various types of processors and modules may also be implemented using a combination of logic hardware and computer readable program code. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server.

The computer program product may be integrated into a client, server and network environment by providing for the computer program product to coexist with applications, operating systems and network operating systems software and then installing the computer program product on the clients and servers in the environment where the computer program product will function. In one embodiment, software is identified on clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a system 100 for implementing meta rules on an executable rule engine. In the depicted embodiment, the system 100 includes a server 105 with a business rule management system ("BRMS") 110. The server 105 is in communication with one or more clients 120a, 120b, 120c, through a network 115.

The server 105 may include a processor and a memory that stores computer readable programs. The memory may be embodied by volatile memory such as dynamic random access memory ("DRAM"), static random access memory ("SRAM"), or other suitable volatile memory. The processor executes the computer readable programs as is well known to those skilled in the art. The computer readable programs may be tangibly stored in storage in the server 105. The storage may include a Solid State Drive ("SSD"), a hard disk drive ("HDD"), an optical storage device, a holographic storage device, a micromechanical storage device, or other non-volatile data storage device. The server 105 may be embodied by a server computer, a desktop computer, a laptop computer, a tablet computer, a mobile device, or another computing device.

The BRMS 110, in one embodiment, is an application to author, manage, and/or execute business rules. A business rule is an executable logic expression that defines logic for an entity such as a business, a company, an organization, an enterprise, and/or the like. In one embodiment, a business rule is a natural language expression. Specifically, a business rule may resemble a sentence and be readable and editable by users of various backgrounds and computer skill levels. Business rules are described in more detail below.

In one embodiment, the BRMS 110 comprises the WebSphere® ILOG from International Business Machines ("IBM") or other suitable BRMS 110. In one embodiment, the BRMS 110 is a computer readable program stored and executed on the server 105.

The network 115 may comprise a communications network such as the Internet, a Local Area Network ("LAN"), a Wireless LAN ("WLAN"), multiple LANs communicating over the Internet, or any other similar communications network. Each client 120a, 120b, 120c communicates with the server 105 through the network 115. A client 120a may be embodied as a desktop computer, a portable computer, a server, a mainframe computer, a handheld computing device, a touch device, a PDA, a tablet computer, an e-Book reader, a mobile phone, a Smartphone, and the like. The client 120a may access the BRMS 110 over the network.

Figure 2:
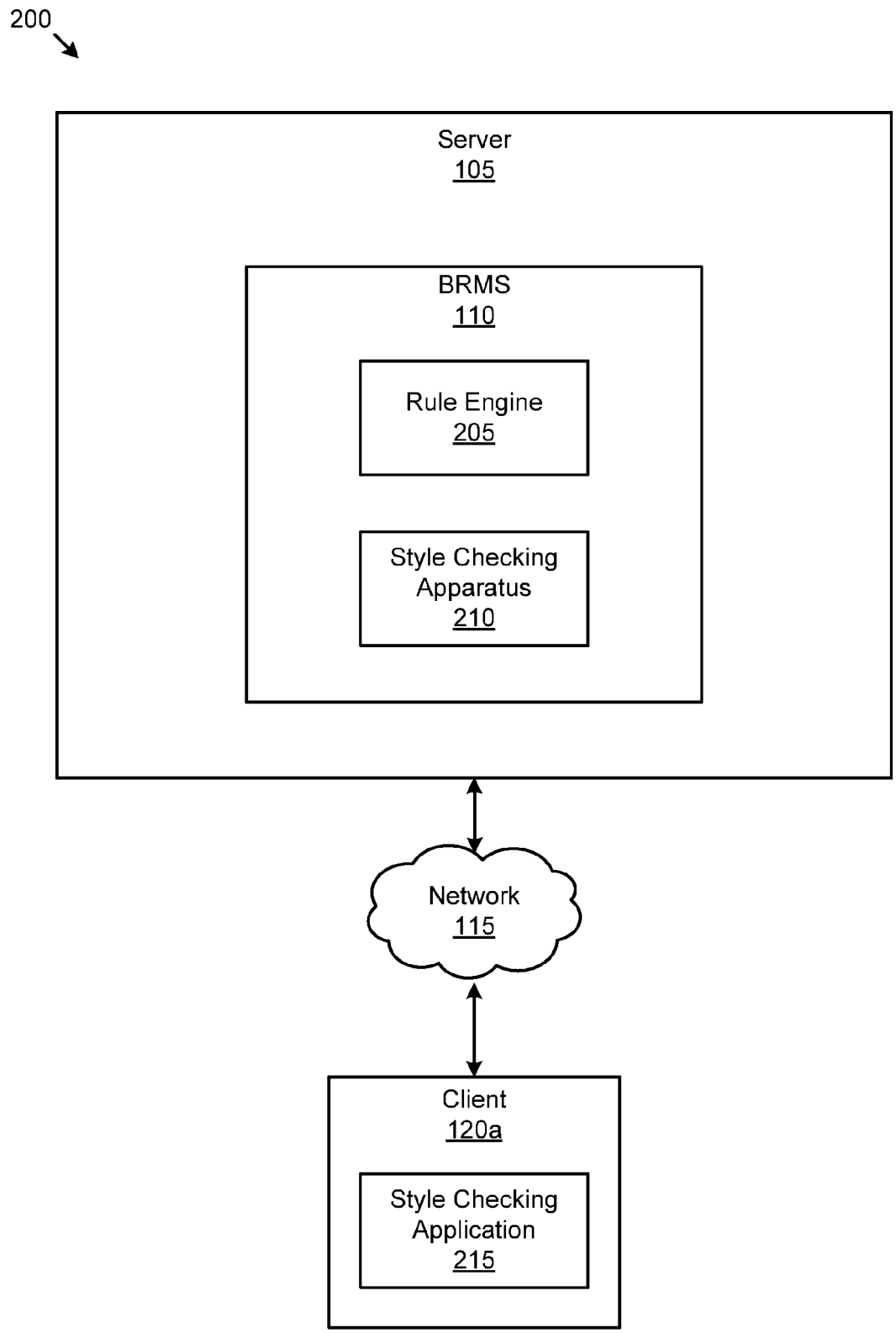
FIG. 2 is a schematic block diagram illustrating another embodiment of a system for implementing meta rules on an executable rule engine in accordance with the present invention.

FIG. 2 is a schematic block diagram illustrating another embodiment of a system 200 for implementing meta rules on an executable rule engine. Specifically, FIG. 2 depicts one embodiment of the server 105 with the BRMS 110, the network 115, and a client 120a, which may be substantially similar to the like named elements in FIG. 1. The BRMS 110 includes a rule engine 205 and a meta rule apparatus 210. Furthermore, the client 120a includes a style checking application 215.

As stated above, the BRMS 110 may author, manage, and/or execute business rules. A business rule may include various components such as objects, conditions, and actions. For example, an insurance company may have business rules that determine a driver's insurance rate, approval of a driver for insurance coverage, and the like. Listed below are several examples of business rules.

```
if
the age of the driver is less than 18
then
set the status of 'application' to "Referred" ;
--------------------------------------------------------------------------------
if
the driver has been involved in more than 4 accidents
then
set the status of 'application' to "Referred" with reason "high risk driver";
--------------------------------------------------------------------------------
if
there is at least one vehicle
where the bodily injury limit per person of this vehicle equals 250 and
the bodily injury limit per accident of this vehicle equals 500,
then
set the status of 'application' to "Referred";
```

Components of business rules include conditions, variables, properties, operators, and actions, performed if a condition resolves to true. The condition includes one or more tests (e.g. the "if, then" statements in the rules above). The object of a business rule is the subject of the condition or the recipient of the action. In the above business rules, the objects include "driver," "application," "vehicle," and the like. The action may include a statement to make an assignment, invoke a function, and/or the like (e.g. set the status of 'application' to "Referred"). Operators allow for comparison of terms in the business rules, including such operators as "is more than," "equals," and/or the like. A business rule may be simpler or more complex than those listed above.

A rule-set is a group of business rules. In one embodiment, business rules of a rule-set are evaluated sequentially. In one embodiment, the business rules in a rule-set may be related. For example, a rule-set may be designated as a rule-set for approving an applicant for an insurance policy and rules of the rule-set may include checking the applicant's age, driving record, vehicle type, and/or the like. In addition, a rule-set may include one or more rule tasks. A rule task is formed by a plurality of business rules for a common task that contributes to the objective of the rule-set. For example, one rule task may include business rules to evaluate the applicant's vehicle and another rule task may include business rules to evaluate the applicant. Together, these two rule tasks may form the rule-set.

In certain embodiments, the BRMS 110 provides a business rule authoring application to enable users to create business rules and process input data with the business rules. The input data may be in the form of a flat file, queried from a database, entered by a user, and the like. For example, a user may input insurance applications that have data in various fields into the BRMS 110 for insurance approval evaluation using business rules. The BRMS 110 may reference the fields in the insurance applications and use the values from specific fields in the business rules (e.g. substitute the value from a "vehicle" field of the input document into the "vehicle" variable of the business rule).

The BRMS 110 may provide and/or allow a user to create a business object model defining objects and variables. For example, a business object model may include a "loan" object with a "requested amount" and a "term" as variables of the loan object. Another object may be an "applicant" with variables of "name," "address," and "income." The user may then create rules to execute against the business object model. For example, the following business rule may be executed against the business object model:

```
if
income of applicant is less than 100,000
then
set the status of 'loan' to "denied";
```

Business rules of the BRMS 110 may conform to a business rule syntax. In one embodiment, a business rule syntax defines, specifies, and/or establishes a language for business rules. Specifically, in one embodiment, the business rule syntax defines semantics of business rules, available components of business rules, available operators, available actions, acceptable natural language terms, and the like. For example, a business rule syntax may specify that business rules should be in an "if-then" format, may associate the natural language terms "is less than" with logic for the corresponding mathematical calculation, and the like.

The rule engine 205 executes business rules by inputting variables from business rule input into the business rules, evaluating the conditions in the business rules, performing the actions in the business rules, and the like. The rule engine 205 executes a business rule in accordance with the logic, definitions, and specification of the business rule syntax. For example, if a business rule includes language that violates the business rule syntax (e.g. is semantically incorrect), or is undefined in the business rule syntax, the rule engine 205 may signal an error and/or be unable to execute the business rule.

The BRMS 110 may provide access to business rules to a variety of users of an entity in varying departments and from varying backgrounds. This broad access may yield business rules that may be semantically correct (e.g. they are executable on the rule engine 205 to obtain correct results), but may vary in style and form. Instead of enforcing style checking on business rules using a technical programming language created and maintained by users proficient in that language, the BRMS 110 in the depicted embodiment, includes the meta rule apparatus 210.

The meta rule apparatus 210 evaluates business rules using meta rules. In one embodiment, a meta rule is also a business rule. In one embodiment, a meta rule is a business rule with conditions to evaluate other business rules. Specifically, instead of inputting insurance applications, vehicle information, or the like into the meta rules as with other business rules, the meta rule apparatus 210 inputs other business rules into the meta rules as described below. As used herein, a meta rule is an expression defining one or more conditions for business rules. In one embodiment, a meta rule defines one or more style conditions for business rules. A style condition is a condition to evaluate whether a business rule violates a predefined style policy. Similar to the business rules, a meta rule may comprise a natural language expression.

A conventional BRMS 110 would be unable to analyze and evaluate a parsed business rule-set using another business rule sharing a common syntax and/or form as the business rules in the rule-set. Specifically, the elements of the parsed business rule-set would be too complex for standard business rules to evaluate usefully. Consequently, the meta rule apparatus 210 allows business rules to be input into and analyzed by other business rules, referred to as meta rules, and provides logic to evaluate the parsed business rules that may be invoked by the meta rules. Specifically, as described below, the meta rule apparatus 210 includes helper functions that evaluate business rules in a parsed business rule-set. In certain embodiments, the meta rules call the helper functions to analyze the parsed business rule-set.

The meta rule apparatus 210 provides meta rules, in certain embodiments, that are creatable and editable by the same users in an entity that create and edit the business rules. In one embodiment, the meta rules conform to the same business rule syntax as the business rules, are executable in the same rule engine 205. In certain embodiments, the meta rules are stored in common storage with the business rules, authored and edited using common rule authoring tools, and/or the like. As a result, users who are not proficient in advanced programming languages and work with the business rules (that are the subject of the style checking) may edit and create the meta rules to run against the business rules.

Using the meta rules, an entity may enforce style policies against its business rules to provide rules with greater uniformity and to verify that the business rules stay in accordance with rule authoring conventions and best practices of the entity. Furthermore, the meta rules are readily editable and creatable by various users to update style convention changes.

The depicted meta rule apparatus 210, in one embodiment, is part of and/or integrated with the BRMS 110. In other embodiments, all or a portion of the meta rule apparatus 210 is separate from the BRMS 110 (e.g. embodied as a separate application) that communicates with the BRMS 110. All or a portion of the meta rule apparatus 210 may be part of, integrated with, and/or in communication with the rule engine 205.

The style checking application 215, in one embodiment, is a front-end application to interface with the BRMS 110 and/or the meta rule apparatus 210. The style checking application 215 may trigger the meta rule apparatus 210 to begin execution of meta rules to check style on a business rule-set. In one embodiment, the style checking application 215 may communicate one or more business rule-sets for style checking and/or may indicate which business rule-sets are to be style-checked. For example, if the business rules are stored on the BRMS 110, the style checking application 215 may indicate to the style checking application 215 of the business rule-sets to style check. In one embodiment, the style checking application 215 is an Internet browser, a plug-in to an Internet browser, or the like, that accesses one or more WebPages provided by the meta rule apparatus 210 and/or the BRMS 110 to receive or select business rule-sets for style checking.

In one embodiment, the style checking application 215 includes an application that resides on a client 120a. In another embodiment, the style checking application 215 is representative of network 115 access to the BRMS 110. For example, the BRMS 110 may include a web page where a user may access the BRMS 110 through the client 120a. One of skill in the art will recognize other possible ways that a user may access the BRMS 110 from a client 120a.

Figure 3:
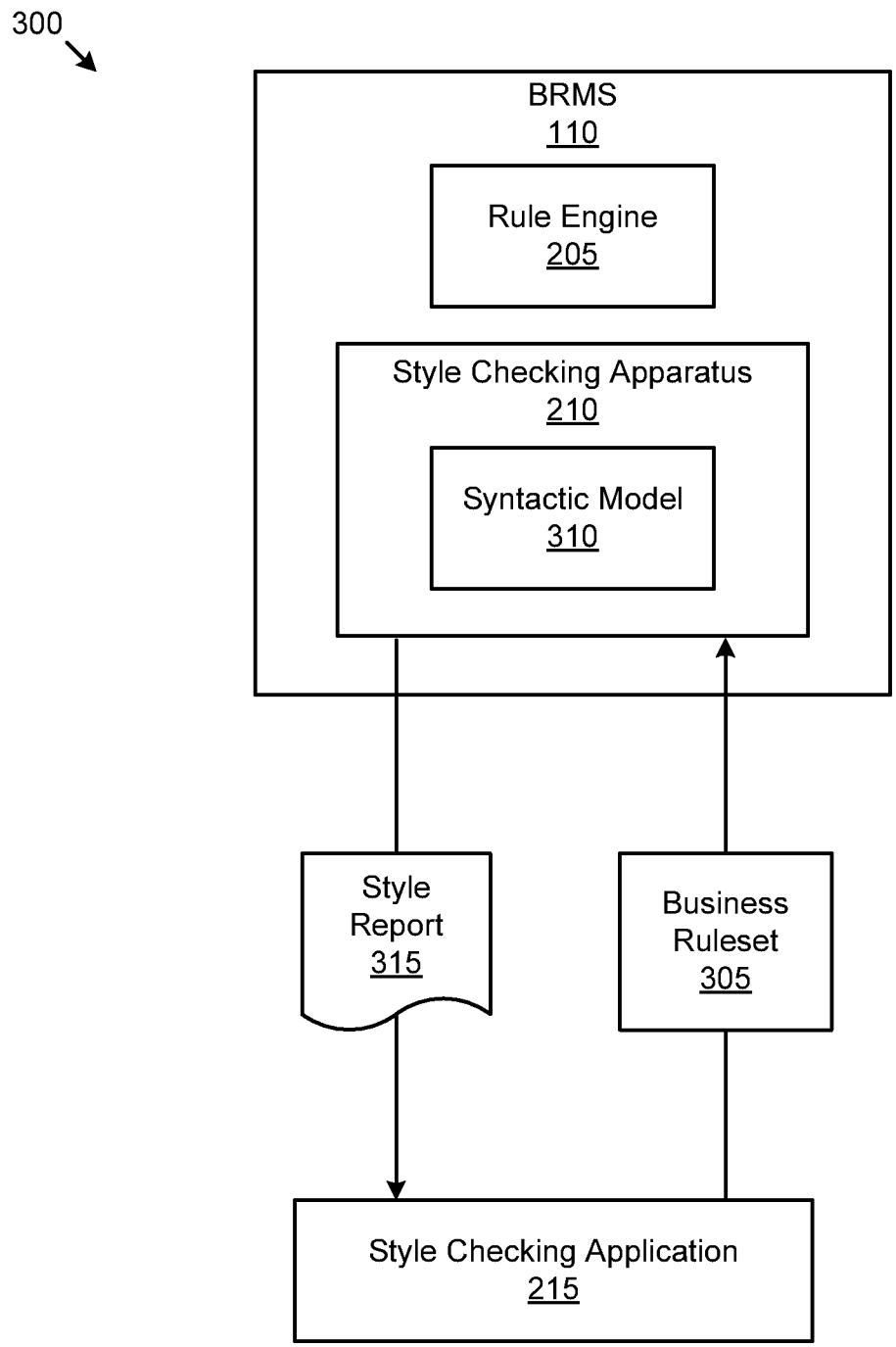
FIG. 3 is a schematic block diagram illustrating one embodiment of a style report data flow accordance with the present invention.

FIG. 3 depicts one embodiment a style report data flow 300 in accordance with the present invention. The depicted embodiment includes the BRMS 110, the rule engine 205, the meta rule apparatus 210 and the style checking application 215 of FIG. 2. The style checking application 215 may communicate a business rule-set 305 to the meta rule apparatus 210. The meta rule apparatus 210 may input the business rule-set 305 into one or more meta rules. In one embodiment, the meta rule apparatus 210 inputs the business rule-set 305 into a meta rule-set. In one embodiment, the meta rule apparatus 210 parses the business rule-set and transforms the business rule-set 305 into a syntactic model 310 that includes components of business rules of the business rule-set 305. The syntactic model 310 may represent the components in a logical structure for analysis by the meta rule apparatus 210. In one embodiment, the meta rule apparatus 210 analyzes the syntactic model 310 using one or more helper functions as described below.

The meta rule apparatus 210, in one embodiment, evaluates the business rules of the business rule-set 305 and generates a style report 315. The style report 315 may include notifications of violations of style conditions of the business rules. The style report 315 may be in an electronic document format, a spreadsheet format, an Extended Markup Language ("XML") file format, or any other suitable format. The style report 315 is described below.

The meta rule apparatus 210 provides for style checking on business rules using the same BRMS 110, the same rule engine 205, and the like, as the business rules to be checked without extra layers of software above the BRMS 110, external style checkers, and rigid, predefined style checking logic un-editable by a user of the business rules to be checked. Instead of style checking logic programmed in advanced languages that users and creators of the business rules to be checked cannot understand, the meta rule apparatus 210 provides style checking rules to check business rules that the same users and creators of those business rules can also create and edit.

Figure 4:
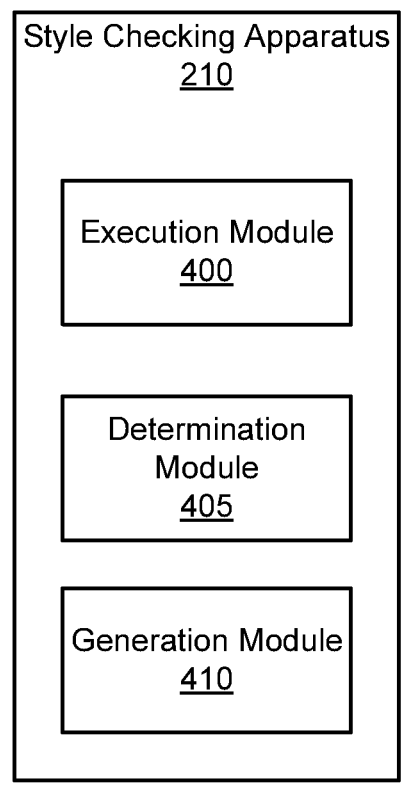
FIG. 4 is a schematic block diagram illustrating one embodiment of a meta rule apparatus in accordance with the present invention.

FIG. 4 is a schematic block diagram illustrating one embodiment of the meta rule apparatus 210 of FIGS. 2-3. The meta rule apparatus 210 includes one or more of an execution module 400, a determination module 405, and a generation module 410.

The execution module 400, in one embodiment, executes, and/or initiates execution of one or more meta rules on a rule engine 205. Initiating execution of the meta rules on the rule engine 205 may include triggering the rule engine 205 to execute the meta rules, inputting meta rules into the rule engine 205 for execution, invoking the meta rules on the rule engine 205, and/or the like. In one embodiment, the execution module 400 uses business rules as input into the meta rules during execution on the rule engine 205. For example, in one embodiment, the execution module 400 executes a meta rule on the rule engine 205 in a similar manner as other, non-meta rule business rules, except that the execution module 400 uses other business rules (the business rules to be style-checked) as input instead of standard business rule input (e.g. insurance applications, vehicle information databases, and the like). Therefore, in one embodiment, the business rules style-checked by the meta rules are executable in the same rule engine 205 as the meta rules, conform to the same business rule syntax as the meta rules, and/or the like. In one embodiment, conforming to the same business rule syntax means that the meta rules and the business rules they style-check are of the same business rule language and are governed by the same semantic rules.

The execution module 400, in one embodiment, parses one or more business rules to extract their components for analysis. Specifically, in one embodiment, the execution module 400 parses a business rule-set to extract one or more components of business rules in the business rule-set. In one embodiment, the execution module 400 transforms the business rule-set into a syntactic model 310 representing the extracted components of business rules in the business rule-set. The syntactic model 310, in certain embodiments, represents components of business rules and the relationship between the components. In one embodiment, the syntactic model 310 is an abstract syntax tree ("AST"). An abstract syntax tree represents the components as nodes and branches in a tree structure. For example, a first branch in the AST may represent an "if" statement and a second branch in the AST may represent an accompanying "else" statement with nodes on each branches representing the condition for each statement along with variables for evaluation in the condition. The AST may be implemented using a linked list, XML, or other suitable data format.

In one embodiment, the execution module 400 executes a meta rule-set having a plurality of meta rules. For example, a user may evaluate a business rule-set 305 using a meta rule-set, having a plurality of meta rules, to test for a plurality of style conditions.

As stated above, a meta rule is an expression defining one or more style conditions for business rules. In one embodiment, a style condition evaluates conditions related to subjective aspects of business rules such as form, appearance, performance, and/or maintainability of a business rule. For example, some business rules may be syntactically and semantically correct, but may not provide optimal performance or may be hard to maintain by business users.

In one embodiment, the style condition is based on an internal style policy of an entity (e.g. an organization). A style condition, in one embodiment, is an evaluation that is independent of syntax, semantics, and/or logic of a business rule. In one embodiment, an issue checked by a style condition is different from a logical, semantic or syntactic issue that would cause a business rule to fail in execution or return a wrong result. For example, a business rule that returns "true" if an applicant has a yearly income over $100,000 that is logically correct and is intended to return "true" in such a condition, may still violate a style condition of a meta rule. A business rule that does not have any unrecognizable natural language expressions and is executable on the rule engine 205, may still violate a style condition of a meta rule.

Therefore, a business rule that violates a style condition may be logically, syntactically and semantically correct. A business rule may return a correct result, be written in accordance with a business rule syntax, and may be executable on the rule engine 205, but may still violate a style policy of an entity and hence, violate a style condition of a meta rule. Style conditions evaluate whether a business rule violates a pre-defined style policy. The style policy relates to rule authoring conventions, such as length of a business rule, complexity of a business rule, whether a business rule lacks documentation, whether a business rule sets a firing limit (an amount of times the business rule may be executed), and/or the like. The style policy may also specify what an entity may consider unwanted drafting practices, such as whether a business rule directly references another rule from the rule-set. In one embodiment, the style policy influences performance of the business rules. The following are some non-limiting examples of possible meta rules:

```
if
the rule use else or
the rule has more than 3 logical operators in the condition or
the rule has more than 5 statements in the action
then
report "rule " + the name of the rule + " is not atomic ";
--------------------------------------------------------------------------------
if
there is one object in the rules bodies of the rule task
where this object is the name of a rule in the ruleset,
then
report "task " + the name of the rule task + " is directly referencing a
rule";
--------------------------------------------------------------------------------
if
the priority of the rule is not null
then
report "rule " + the name of the rule + " is using priority" ;
```

```
--------------------------------------------------------------------------------
if
the firing limit of the rule task is not 0
then
report "task " + the name of the rule task + " is using firing limit" ;
```

For each business rule, the execution module 400, in one embodiment, parses the business rule and/or receives a parsed business rule (as described below) and inputs the business rule and/or components of the business rule into variables of the meta rules. For example, for the following meta rule:

```
if
the formal comment of the rule is null
then
report "rule" + the name of the rule + "is not documented" ;
```

The execution module 400 may substitute a reference to the business rule for the variable "rule," the value of the business rule comment component for the variable "formal comment," and the business rule name component for the variable "the name of the rule." In certain embodiments, the execution module 400 may substitute references to and/or components of business rule tasks and business rule-sets 305 into a meta rule such as in the following meta rule:

```
definitions
set task1 to a rule task ;
set task2 to a rule task ;
if
the algorithm of task1 does not equal the algorithm of task2
then
report "rule tasks using different algorithms may impact performances".
```

The determination module 405, in one embodiment, determines whether business rules violate style conditions defined by meta rules. In one embodiment, the determination module 405 determines that a business rule violates a style condition defined by the meta rule in response to components of the business rule—substituted into variables of the meta rule—violate style conditions. In the example above, the determination module 405 may determine that a business rule with a "null" as the value for the business rule comment component violates the meta rule.

In one embodiment, the determination module 405 is not limited to determining whether business rules violate style conditions. In certain embodiments, the determination module 405 may determine whether a rule-set or a rule task violates a style condition by including a rule-set or a rule task in an evaluation as in the meta rule above.

In one embodiment, the determination module 405 performs the logic associated with a condition in a meta rule. In certain embodiments, the determination module 405 uses a helper function to evaluate the style condition as described below. For example, certain conditions may be determined by referencing a value for a component (e.g. a name of a rule), while the determination module 405 may analyze the syntactic model 310 for one or more business rules to determine other conditions (e.g. counting how many statements are in the action of a business rule).

The generation module 410, in one embodiment, generates a notification in response to determining that the business rule violates the style condition of the meta rule. The notification may include identifiers for the violating business rule, the meta rule violated, a description of the violation, and the like. Generating a notification may include making an entry in a log, outputting to a display, storing the notification in volatile memory for inclusion in a style report 315 for multiple business rules, and the like. In one embodiment, the generation module 410 is triggered by the action of the meta rule. For example, in the following meta rule:

```
if
    the formal comment of the rule is null
then
    report "rule" + the name of the rule + "is not documented" ;
``` the generation module 410 may generate a notification with the name of the rule along with the text "is not documented."

In one embodiment, the generation module 410 generates a style report 315. The style report 315 may includes a notification for a plurality of business rules (e.g. a business rule-set) detailing style condition violations of the plurality of business rules. In one embodiment, the generation module 410 generates a style report 315 for one or more rule-sets. As stated above, the style report 315 may be in an electronic document format, a spreadsheet format, an Extended Markup Language ("XML") file format, or any other suitable format.

Figure 5:
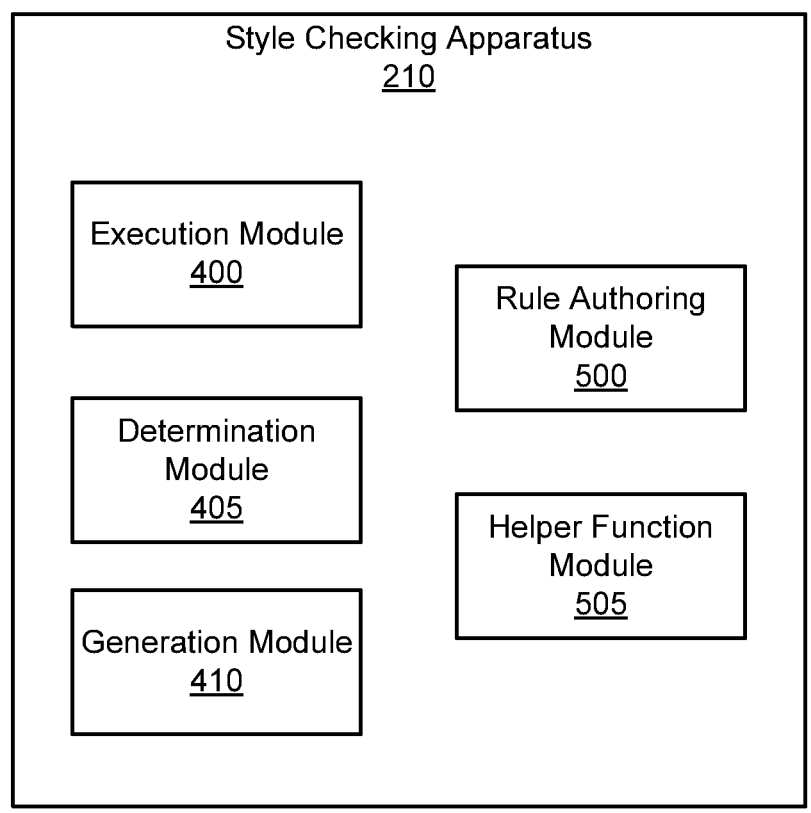
FIG. 5 is a schematic block diagram illustrating another embodiment of a meta rule apparatus in accordance with the present invention.

FIG. 5 is a detailed schematic block diagram illustrating another embodiment of a meta rule apparatus 210. In the depicted embodiment, the meta rule apparatus 210 includes the execution module 400, the determination module 405, and the generation module 410, which are substantially similar to those described in relation to FIG. 5. In the depicted embodiment, the meta rule apparatus 210 further includes one or more of a rule authoring module 500 and a helper function module 505, which are described below.

The rule authoring module 500, in one embodiment, creates meta rules and/or enables a user to author meta rules. In one embodiment, the rule authoring module 500 receives style definition input through a rule authoring application. In one embodiment, the rule authoring application is part of the BRMS 110 and users may also author non-meta rule business rules (e.g. business rules that are style-checked by the meta rules) using the rule authoring application.

The style definition input defines one or more components for a particular meta rule. Style definition input includes, in one embodiment, components of the meta rule such as variables, actions, and conditions. For example, a user may enter "the rule has more than 3 logical operators in the condition" as style definition input. In one embodiment, the rule authoring module 500 further creates a meta rule using the rule authoring application, the particular meta rule based on the style definition input. The rule authoring module 500 may receive style definition input from other applications, from users through text input, or other suitable input methods.

As stated above, in one embodiment, a user is also able to create non-style business rules with the rule authoring application. Therefore, the rule authoring module 500 may create one or more business rules based on business rule definition input. Similar to the style definition input as described above, business rule definition input may include components of the business rule such as variables, actions, and conditions, except that the business definition input may define components related to non-style variables, actions and conditions.

The helper function module 505, in one embodiment, analyzes the syntactic model 310 using helper functions. The helper function module 505, in one embodiment, is part of and/or is in communication with the determination module 405. In one embodiment, the helper function module 505 is invoked by the meta rule and/or the determination module 405. The helper function module 505 provides helper functions to allow for higher level processing of the syntactic model 310. Specifically, a user does not have to code the logic in the meta rule to analyze the syntactic model 310 to evaluate the condition. The syntactic model 310 representing a parsed business rule-set would be too complex for evaluation by business rules sharing a common syntax and/or form with the business rules being evaluated without the use of helper functions.

Helper functions, in certain embodiments, include logic to iterate through the syntactic model 310 to evaluate conditions set forth in the meta rules. For example, for a meta rule with a condition evaluating the number of operators in a condition, the meta rule may invoke the helper function module 505 which may analyze the syntactic model 310 with a helper function that iterates through the syntactic model 310, counting the number of operator nodes for a particular business rule. In one embodiment, the helper function module 505 associates components of a meta rule with corresponding helper functions. For example, the helper function module 505, in one embodiment, associates a helper function for counting a number of logical operators with a condition of a meta rule evaluating whether a business rule has "more than [variable] logical operators." When a meta rule calls the component, the helper function module 505 triggers the appropriate helper functions. The helper function module 505, in one embodiment, includes helper functions with logic to count statements in an action, to reference rule names in business rules or rule-sets, and/or the like. Specifically, a helper function, in one embodiment, traverses the AST (e.g. the syntactic model), returning and/or evaluating nodes of the AST that represent elements of a business rule and/or business rule-set. For example, if a helper function evaluates the number of conditions of a specific business rule, the help function may iterate through a portion of the AST for the business rule, referencing each node that represents a condition, and counting the number of nodes that represent conditions. In one embodiment, various element of business rules of a business rule-set are represented by nodes in the AST and the helper functions return and/or access the nodes to obtain information about the various elements.

For example, the following meta rule determines which business rules in a business rule-set have print statements:

```
definitions
    set 'the function' to a function in the functions of the ruleset;
if
    'the function' has print statement
then
    report "has print statement" for 'the function' ;
```

The following is a non-limiting example embodiment of a helper function, written in JAVA, that retrieves the "the functions of the ruleset" from the syntactic model 310 for evaluation by the meta rule:

```
public static List<IlrFunctionFactory> getFunctions(IlrRulesetFactory ruleset)
{
    List<IlrFunctionFactory> functions = new ArrayList<IlrFunctionFactory>( );
    IlrPackageFactory[ ] pkgArray = ruleset.getPackages( );
    for (int i = 0; i < pkgArray.length; i++) {
        IlrPackageFactory pkg = pkgArray[i];
        IlrFunctionFactory[ ] funcArray = pkg.getFunctions( );
        if (funcArray != null) {
            for (IlrFunctionFactory func : funcArray) {
                functions.add(func);
```

-continued

```
      }
    }
  }
  return functions;
}
```

Example Code 1

In Example Code 1, the call to "getFunctions" traverses the AST and returns nodes of the AST that represent function elements. Similarly, the method "getPackages" traverses nodes of the AST and returns package elements. In one embodiment, packages are groups of business rules in a business rule-set.

For the following meta rule:

```
if
  the number of elements in the definitions of the rule is more than 3
then
  report "too many definitions" for the rule;
```

In one embodiment, of the helper function, in the example JAVA code below, retrieves the "the definitions of the rule" from the syntactic model 310.

```
public static List<IlrVariable> getVariables(IlrRuleFactory rule)
{
    List<IlrVariable> variables = new ArrayList<IlrVariable>( );
    IlrCondition[ ] conditions = rule.getConditions( );
    for (IlrCondition condition : conditions) {
        if (condition instanceof IlrSimpleCondition) {
            IlrVariable variable = ((IlrSimpleCondition)
            condition).getObjectBinding( );
            if (variable != null) {
                variables.add(variable);
            }
        } else if (condition instanceof IlrEvaluateCondition) {
            IlrVariable[ ] vars = ((IlrEvaluateCondition)
            condition).getBindings( );
            if (vars != null) {
                for (IlrVariable var : vars) {
                    if (var != null) {
                        variables.add(var);
                    }
                }
            }
        }
    }
    return variables;
}
```

Example Code 2

The Java method in Example Code 2 traverses the AST and returns nodes of the AST that represent variables of business rules, used in the different type of conditions of the rule (here IlrSimpleCondition or IlrEvaluateCondition).

Figure 6:
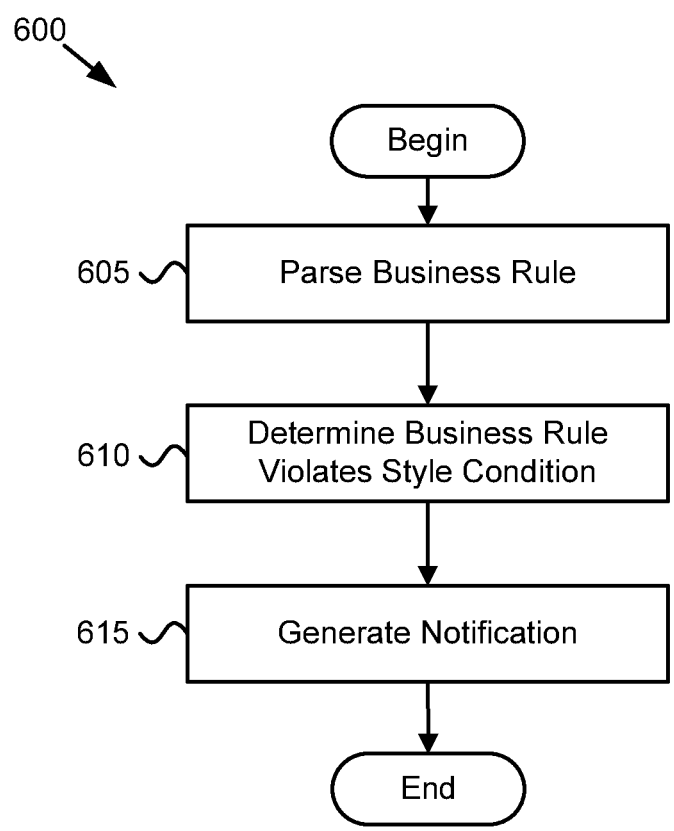
FIG. 6 is a schematic flow chart diagram illustrating one embodiment of a method for implementing meta rules on an executable rule engine in accordance with the present invention.

FIG. 6 is a schematic flow chart diagram illustrating one embodiment of a method 600 for implementing meta rules on an executable rule engine. The method 600 begins and the execution module 400 parses 605 a business rule as input into a meta rule on a rule engine 205. The meta rule includes a first expression defining one or more style conditions for business rules. The business rule is a second expression defining logic for an entity. The determination module 405 determines 610 that a business rule violates a style condition defined by the meta rule. The business rule and the meta rule may conform to a common business rule syntax. In one embodiment, the business rule includes a portion of a business rule-set. The business rule-set includes the business rule and one or more additional business rules. The generation module 410 generates 615 a notification in response to determining that the business rule violates the style condition of the meta rule, and the method 600 ends.

Figure 7:
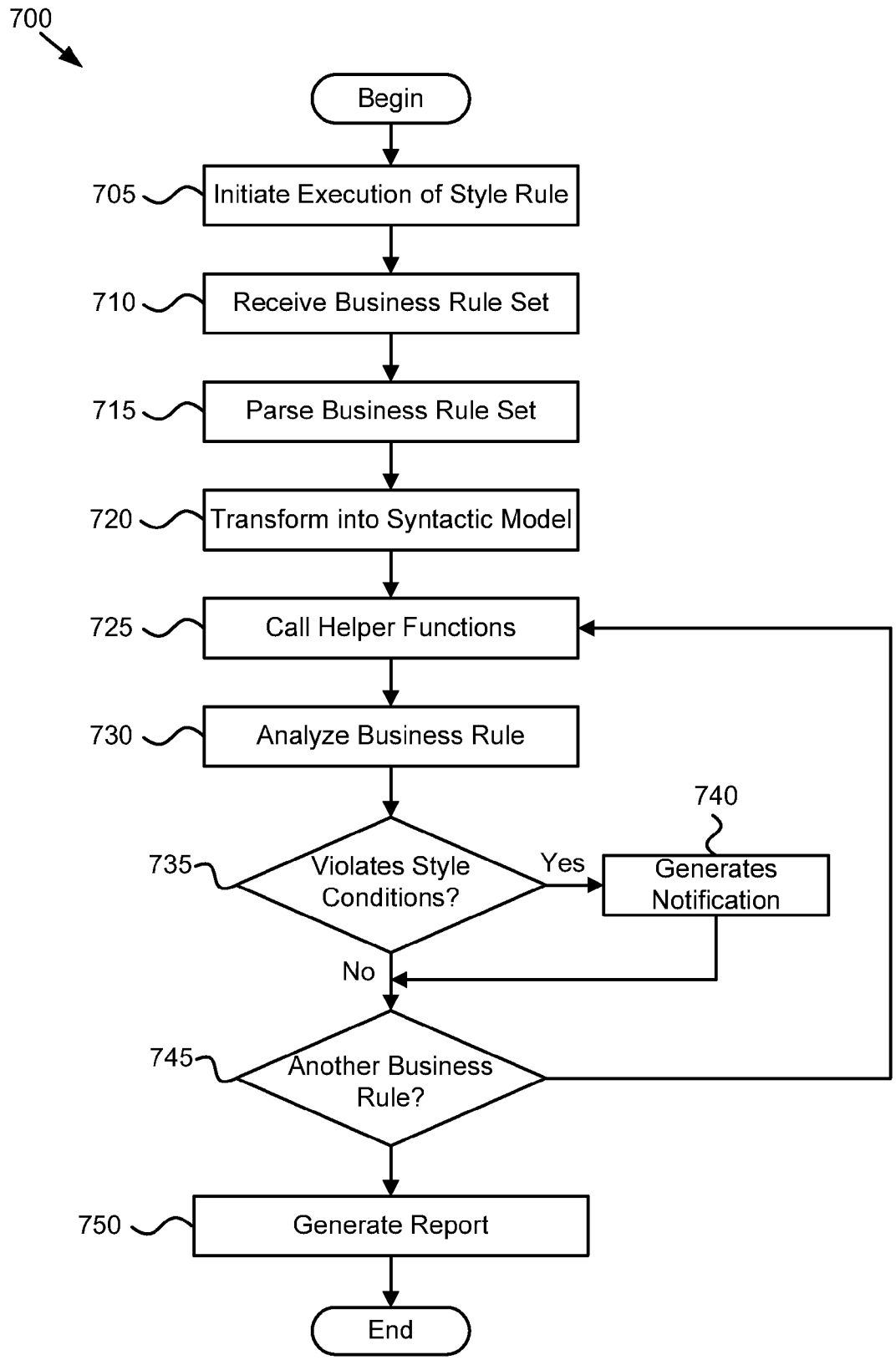
FIG. 7 is a detailed schematic flow chart diagram illustrating one embodiment of a method for performing style checking on a business rule-set in accordance with the present invention.

FIG. 7 is a schematic flow chart diagram illustrating one embodiment of a method 700 for performing style checking on business rules. The method 700 begins and execution module 400 initiates execution 705 of one or more meta rules on a rule engine 205. The execution module 400 receives 710 a business rule-set that includes a plurality of business rules. The execution module 400 parses 715 the business rule-set to extract one or more components of business rules in the business rule-set. The execution module 400 transforms 720 the business rule-set into a syntactic model 310 representing the one or more components of business rules in the business rule-set. The helper function module 505 calls 725 one or more helper functions to analyze the syntactic model 310 in evaluating conditions of a particular business rule of the business rule set and the helper function module 505 analyze 730 the particular business rule with one or more helper functions. The determination module 405, based on results obtained from the helper functions, determines 735 whether the particular business rule violates one or more style conditions defined by the one or more meta rules.

If the determination module 405 determines 735 that the particular business rule violates the one or more style conditions, the generation module 410 generates a notification of the violation and the method 700 continues with step 745. If the determination module 405 determines 735 that the particular business rule does not violate any style conditions, the method 700 proceeds directly to step 745. If the determination module 405 determines 745 that there is another business rule in the business rule-set to analyze, the method 700 returns to step 725 and the helper function module 505 calls one or more helper functions for the next business rule. Alternatively, the generation module 410 generates a style report 315 with the style condition violations for the business rule-set and the method 700 ends. In one embodiment, steps 735-745 are associated with the execution of the meta rules.

Figure 8A:
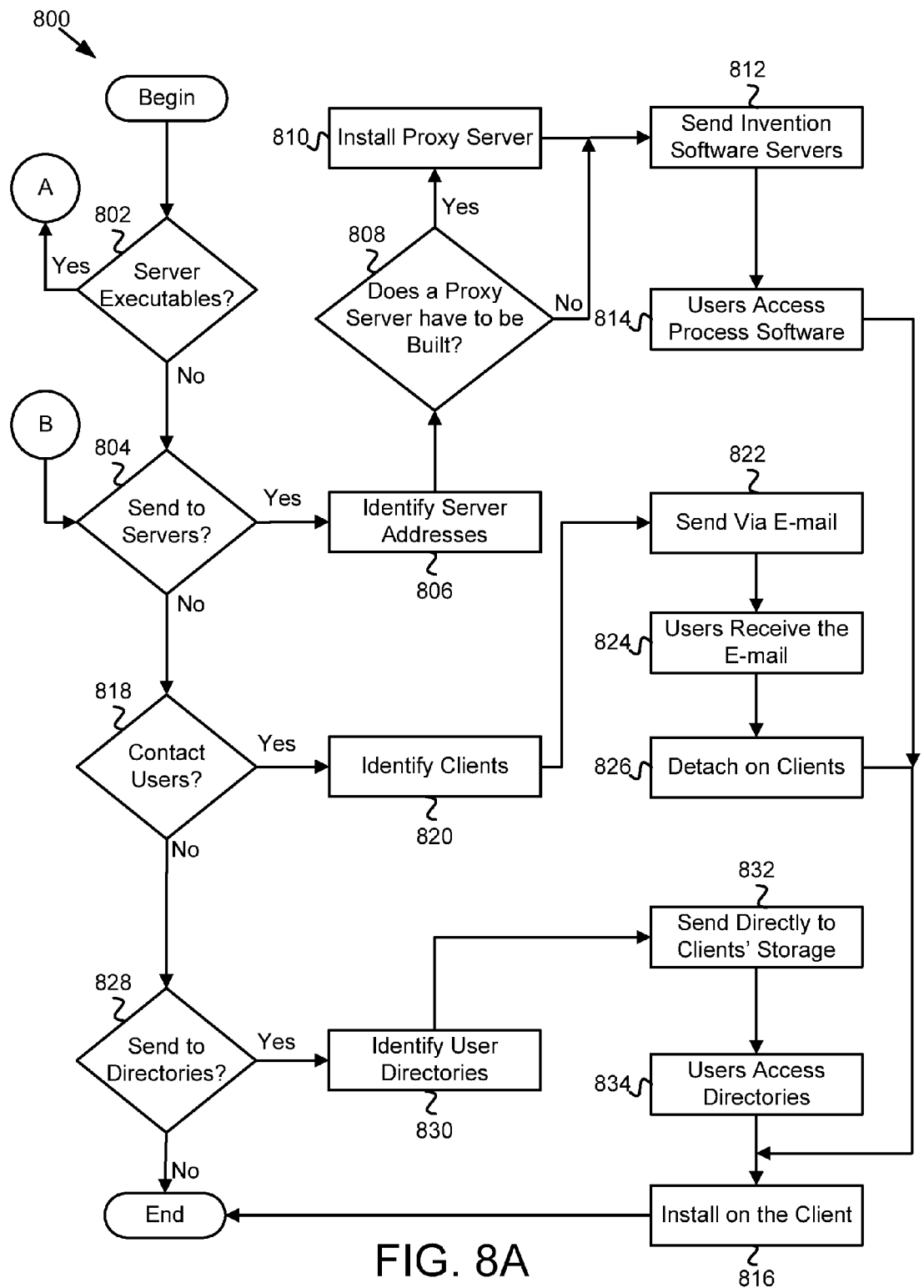
FIG. 8A is a schematic flow chart diagram illustrating one embodiment of a method for deploying a meta rule apparatus in accordance with the present invention.

FIG. 8A is a schematic flow chart diagram illustrating one embodiment of a method 800 for deploying a meta rule apparatus 210. While it is understood that the process software embodying the meta rule apparatus 210 may be deployed by manually loading directly in the client, server and proxy computing systems via loading a storage medium such as a CD, DVD, etc., the process software may also be automatically or semi-automatically deployed into a computer system by sending the process software to a central server or a group of central servers. The process software is then downloaded into the client computing systems that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computing system storage medium (e.g. a hard drive). When there are proxy servers, the process will, select the proxy server code, determine on which computers to place the proxy servers' code, transmit the proxy server code, then install the proxy server code on the proxy computer. The process software may be transmitted to the proxy server and then it may be stored on the proxy server for download to the computing system from the proxy server.

Figure 8B:
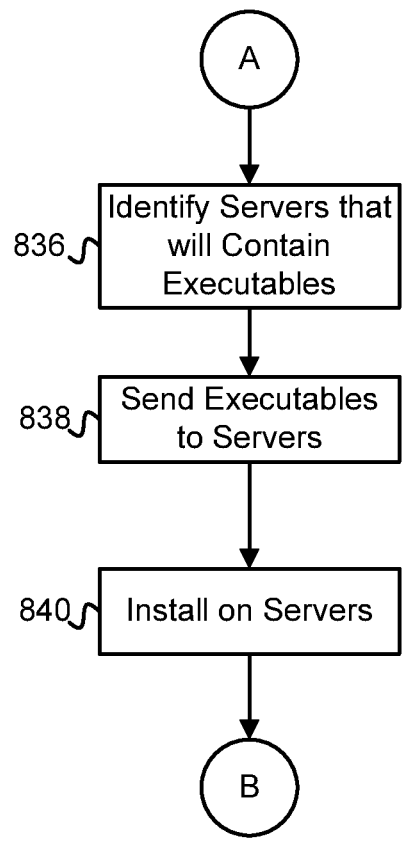
FIG. 8B is a continuation of FIG. 8A illustrating one embodiment of a method for deploying a meta rule apparatus in accordance with the present invention.

The method 800 for deployment of the process software begins and a determination 802 is made if there are any programs that will reside on a server or servers when the process software is executed. If this is the case, referring to FIG. 8B, the servers that will contain the executables are identified 836. The process software for the server or servers is transferred 838 directly to the servers' storage via FTP or some other protocol or by copying though the use of a shared file system. The process software is then installed 840 on the servers.

Next, referring back to FIG. 8A, a determination 804 is made on whether the process software is be deployed by having users access the process software on a server or servers. If the users are to access the process software on servers then the server addresses that will store the process software are identified 806. A determination 808 is made if a proxy server is to be built to store the process software. A proxy server is a server that sits between a client application, such as a Web browser, and a real server. It intercepts all requests to the real server to see if it can fulfill the requests itself. If not, it forwards the request to the real server.

The two primary benefits of a proxy server are to improve performance and to filter requests. If a proxy server is required then the proxy server is installed 810. The process software is sent 812 to the servers either via a protocol such as FTP or it is copied directly from the source files to the server files via file sharing. Another embodiment would be to send a transaction to the servers that contained the process software and have the server process the transaction, then receive and copy the process software to the server's file system. Once the process software is stored at the servers, the users, via their client computers, then access 814 the process software on the servers and copy to their client computers file systems. Another embodiment is to have the servers automatically copy the process software to each client and then run the installation program for the process software at each client computer. The user executes the program that installs 816 the process software on his client computer then the method 800 ends.

In step 818, a determination is made whether the process software is to be deployed by sending the process software to users via e-mail. The set of users where the process software will be deployed are identified 820 together with the addresses of the user client computers. The process software is sent via e-mail to each of the users' client computers. The users then receive the e-mail 824 and then detach 826 the process software from the e-mail to a directory on their client computers. The user executes the program that installs 816 the process software on his client computer then the method 800 ends.

Lastly a determination 828 is made on whether to the process software will be sent directly to user directories on their client computers. If so, the user directories are identified 830. The process software is transferred 832 directly to the user's client computer directory. This can be done in several ways such as but not limited to sharing of the file system directories and then copying from the sender's file system to the recipient user's file system or alternatively using a transfer protocol such as File Transfer Protocol (FTP). The users access 834 the directories on their client file systems in preparation for installing the process software. The user executes the program that installs the process software on his client computer 816 then the method 800 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   parsing a business rule as input into a meta rule executing on a rule engine, the meta rule comprising a first expression defining one or more style conditions for business rules, the business rule comprising a second expression defining logic for an entity, wherein a style condition evaluates one or more conditions related to a subjective aspect of a business rule without evaluating a syntactical structure of the business rule, the one or more style conditions being based on a style policy of the entity;
   determining that a business rule violates a style condition defined by the meta rule, the business rule and the meta rule conforming to a common business rule syntax, the business rule syntax defining a structure of a business rule language, wherein a business rule that does not conform to the business rule syntax is not executable, and wherein a business rule that violates a style condition, but conforms to the business rule syntax, is executable; and
   generating a notification in response to determining that the business rule violates the style condition of the meta rule.

2. The method of claim 1, wherein the business rule comprises one of a plurality of business rules in a business ruleset, wherein the method further comprises determining whether business rules of the business rule set violates the style condition of the meta rule.

3. The method of claim 2, wherein parsing the business rule further comprises parsing the business rule-set to extract one or more components of the business rules in the business rule-set and transforming the components of the business rule-set into a syntactic model representing the one or more components of the business rule-set.

4. The method of claim 3, wherein determining that the business rule violates a style condition defined by the meta rule further comprises analyzing, using a helper function, the syntactic model, the helper function invoked by the meta rule.

5. The method of claim 4, wherein the syntactic model comprises an abstract syntax tree.

6. The method of claim 1, wherein the business rule is executable on the rule engine.

7. The method of claim 1, wherein the one or more style conditions of the meta rule comprise predefined business rule conventions specifying unwanted characteristics of business rules.

8. The method of claim 1, further comprising:
   receiving style definition input through a rule authoring application, the style definition input defining one or more components for a particular meta rule; and
   creating, using the rule authoring application, the particular meta rule based on the style definition input.

9. The method of claim 8, wherein the rule authoring application creates one or more particular business rules based on business rule definition input.

10. The method of claim 1, wherein each of the meta rule and the business rule comprise natural language expressions.

11. The method of claim 1, further comprising generating a style report, the style report comprising the notification for the business rule and one or more additional notifications for one or more additional business rules, the one or more additional notifications indicating that the one or more additional business rules violate style conditions of the meta rule.

12. A computer program product comprising a non-transitory computer readable storage medium having computer readable program code embodied therewith, the computer readable program code comprising computer readable program code configured for:

parsing a business rule as input into a meta rule executing on a rule engine, the meta rule comprising a first expression defining one or more style conditions for business rules, the business rule comprising a second expression defining logic for an entity, wherein a style condition evaluates one or more conditions related to a subjective aspect of a business rule without evaluating a syntactical structure of the business rule, the one or more style conditions being based on a style policy of the entity;

determining that a business rule violates a style condition defined by the meta rule, the business rule and the meta rule conforming to a common business rule syntax, the business rule syntax defining a structure of a business rule language, wherein a business rule that does not conform to the business rule syntax is not executable, and wherein a business rule that violates a style condition, but conforms to the business rule syntax, is executable; and generating a notification in response to determining that the business rule violates the style condition of the meta rule.

13. The computer program product of claim 12, wherein the business rule is executable on the rule engine.

14. The computer program product of claim 12, wherein the one or more style conditions of the meta rule comprise predefined business rule conventions specifying unwanted characteristics of business rules.

15. A method comprising:

deploying a meta rule apparatus onto a computing system, the meta rule apparatus capable of:

parsing a business rule as input into a meta rule on a rule engine, the meta rule comprising a first expression defining one or more style conditions for business rules, the business rule comprising a second expression defining logic for an entity, wherein a style condition evaluates one or more conditions related to a subjective aspect of a business rule without evaluating a syntactical structure of the business rule, the one or more style conditions being based on a style policy of the entity;

determining that a business rule violates a style condition defined by the meta rule, the business rule and the meta rule conforming to a common business rule syntax, the business rule syntax defining a structure of a business rule language, wherein a business rule that does not conform to the business rule syntax is not executable, and wherein a business rule that violates a style condition, but conforms to the business rule syntax, is executable; and generating a notification in response to determining that the business rule violates the style condition of the meta rule.

16. The method of claim 15, wherein deploying the meta rule apparatus onto the computing system comprises one of:

loading onto the computing system with a storage medium storing the meta rule apparatus;

sending the meta rule apparatus to a central server, wherein the meta rule apparatus is downloaded onto the computing system;

sending the meta rule apparatus to a storage medium of the computing system; and sending the meta rule apparatus to a proxy server, wherein the meta rule apparatus is downloaded to the computing system from the proxy server.

* * * * *